US009626810B2

(12) United States Patent
Ko

(10) Patent No.: US 9,626,810 B2
(45) Date of Patent: Apr. 18, 2017

(54) METHOD FOR PROVIDING TELEMATICS SERVICE

(71) Applicant: Hyundai Motor Company, Seoul (KR)

(72) Inventor: Jae Yoon Ko, Yongin-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/959,739

(22) Filed: Dec. 4, 2015

(65) Prior Publication Data

US 2017/0061707 A1 Mar. 2, 2017

(30) Foreign Application Priority Data

Aug. 25, 2015 (KR) ........................ 10-2015-0119297

(51) Int. Cl.
*H04W 8/18* (2009.01)
*G07C 5/00* (2006.01)

(52) U.S. Cl.
CPC .................................... *G07C 5/008* (2013.01)

(58) Field of Classification Search
USPC ........ 455/435.1, 435.2; 340/5.61, 5.62, 5.63, 340/5.8; 701/29.6, 31.4, 32.7, 36
See application file for complete search history.

(56) References Cited

U.S. PATENT DOCUMENTS 7,092,799 B2* 8/2006 Oesterling .......... B60R 16/0231 701/1
2004/0023647 A1* 2/2004 Mazzara, Jr. ......... H04B 7/1853 455/419
2004/0203692 A1* 10/2004 Schwinke .............. G07C 5/008 455/419
2005/0128051 A1* 6/2005 Dickinson ............ B41J 2/17546 340/5.61
2006/0046649 A1* 3/2006 Videtich ................ H04H 20/57 455/12.1
2012/0252475 A1* 10/2012 Farrell ................... G08G 1/205 455/450
2015/0170432 A1* 6/2015 Ko .......................... H04W 4/12 340/870.01

(Continued)

FOREIGN PATENT DOCUMENTS

JP 2003153341 A 5/2003
JP 3982524 B 7/2007

(Continued)

Primary Examiner — Thomas Tarcza
*Assistant Examiner* — Richard Goldman
(74) *Attorney, Agent, or Firm* — Brinks Gilson & Lione

(57) ABSTRACT

Disclosed are methods for providing a telematics service, and in particular, methods for providing a telematics service to a replaced terminal after a telematics terminal installed in a vehicle is replaced. A method for operating a telematics terminal installed in a vehicle includes determining whether the telematics terminal is a replaced terminal when the vehicle is turned on, transmitting an enrollment request signal to a telematics center when the telematics terminal is the replaced terminal, processing service enrollment according to an enrollment message transmitted in response to the enrollment request signal, transmitting terminal information of the telematics terminal to the telematics center upon completing the service enrollment, and receiving a telematics service determined based on the terminal information.

19 Claims, 4 Drawing Sheets

(56) References Cited

U.S. PATENT DOCUMENTS

2016/0119823 A1* 4/2016 Ko ........................ H04W 24/08
370/252

FOREIGN PATENT DOCUMENTS

| | | | |
|---|---|---|---|
| JP | 4622177 | B | 11/2010 |
| JP | 4931957 | B | 2/2012 |
| JP | 5435022 | B | 12/2013 |
| JP | 5686697 | B | 1/2015 |
| KR | 10-0862151 | B1 | 9/2008 |
| KR | 10-2014-0059665 | | 5/2014 |
| KR | 10-2015-0068517 | | 6/2015 |

* cited by examiner

METHOD FOR PROVIDING TELEMATICS SERVICE

CROSS-REFERENCE TO RELATED APPLICATION

This application claims the benefit of Korean Patent Application No. 10-2015-0119297, filed on Aug. 25, 2015, which is hereby incorporated by reference.

FIELD

The present disclosure relates to a method for providing a telematics service, and more particularly, to a method for providing a telematics service to a telematics terminal that is replaced in a vehicle.

BACKGROUND

Recently, there have been provided telematics services for providing various multimedia functions such as a navigation function for guiding drivers and passengers of a vehicle to a destination, a burglar alarm, emergency recovery (SOS), remote diagnosis, expendables management, a handsfree mobile phone, living information, personal information, a secretarial service, and Internet access. In particular, a telematics terminal with a telematics service includes a mobile communication module installed therein, and thus the terminal itself may perform mobile communication and may also allow a cellular phone of a user to be connected to the terminal so as to be used as a handsfree phone.

The telematics terminal may be installed and used in a vehicle and may need to be replaced with a new telematics terminal for reasons such as malfunction and age of the telematics terminal. In order to replace a used telematics terminal with a new telematics terminal, a process proceeds to follow the normal procedure. A user visits a telematics center so as to let a repairer (or a dealer) replace the terminal and notifies the telematics center providing a telematics service of the terminal information and vehicle information so as to let a manager of the telematics center cancel a service for the used terminal and transmit a service enrollment message to the new terminal.

This process forces the user to visit the center, causing inconvenience and wasting time and money, and when specifications between the used terminal and the new terminal are different (e.g., encryption logic is applied to the used terminal according to communication security and is not applied to the new terminal due to non-application of communication security), the new terminal cannot normally used.

SUMMARY

Accordingly, the present disclosure is directed to a method for providing a telematics service that substantially obviates one or more problems due to limitations and disadvantages of the related art.

An object of the present disclosure is to provide a method for providing a telematics service for automatically providing a normal telematics service to a replaced telematics terminal.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an operating method of a telematics terminal installed in a vehicle includes determining whether the telematics terminal is a replaced terminal when the vehicle is turned on, transmitting an enrollment request signal to a telematics center when the telematics terminal is the replaced terminal, processing service enrollment according to an enrollment message transmitted in response to the enrollment request signal, transmitting terminal information of the telematics terminal to the telematics center upon completing the service enrollment, and receiving a telematics service determined based on the terminal information.

The enrollment request signal may include a vehicle number of the vehicle and a telephone number of the telematics terminal.

Whether the telematics terminal is a replaced terminal may be determined according to a result obtained by comparing a vehicle number stored by the telematics terminal with a vehicle number of the vehicle.

The service may be enrolled in the same enrollment state as a previous enrollment state of the vehicle.

The terminal information may include at least one of model information, terminal software version information, modem software version information, navigation software version information, security communication information, and voice/multimedia over long term evolution (VoLTE) information.

The method may further include transmitting new terminal information of the telematics terminal to the telematics center when the vehicle is turned on, and receiving a telematics service determined based on the new terminal information.

In another aspect of the present disclosure, an operating method of a telematics center for providing a telematics service to a telematics terminal installed in a vehicle includes receiving an enrollment request signal from the telematics terminal when the telematics terminal is a replaced terminal, transmitting an enrollment message according to a previous enrollment state of the vehicle containing the telematics terminal for transmitting the enrollment request signal, receiving terminal information of the telematics terminal that is transmitted after service enrollment is completed according to the enrollment message, and providing a telematics service determined based on the terminal information.

It is to be understood that both the foregoing general description and the following detailed description of the present disclosure are exemplary and explanatory and are intended to provide further explanation of the disclosure as claimed.

DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings.

DETAILED DESCRIPTION

A method for providing a telematics service will now be described in detail to the preferred forms of the present disclosure, examples of which are illustrated in the accompanying drawings. The suffixes “module” and “unit” of elements herein are used for convenience of description and thus can be used interchangeably and do not have any distinguishable meanings or functions.

Figure 1:
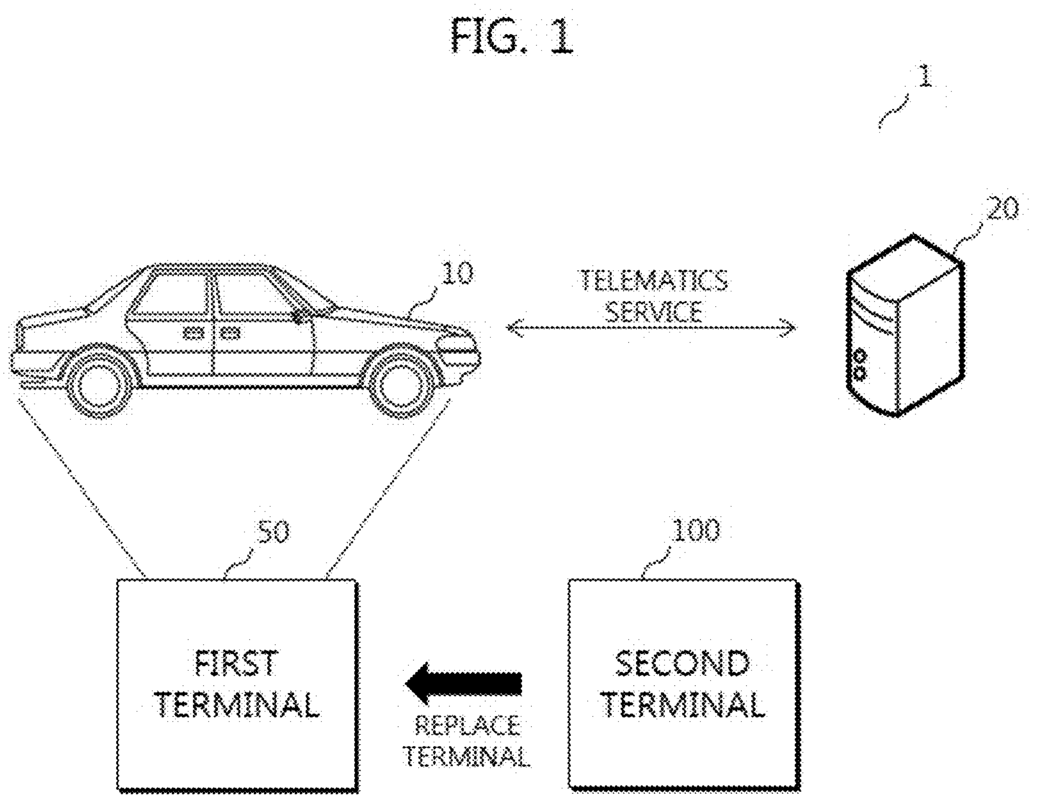
FIG. 1 is a block diagram illustrating a telematics service system.

FIG. 1 is a block diagram illustrating a telematics service system 1.

Referring to FIG. 1, the telematics service system 1 may include a vehicle 10, a telematics center 20, a first terminal 50, and a second terminal 100.

The vehicle 10 is a vehicle in which a telematics terminal for receiving a telematics service is capable of being installed, and the telematics service refers to a service for providing a mobile service, an interactive Internet function, and a multimedia function, such as a navigation function, a burglar alarm, emergency recovery (SOS), remote diagnosis, expendables management, a handsfree mobile phone, living information, personal information, a secretarial service, and Internet access, using the telematics terminal. The vehicle 10 may be distinguishable from another vehicle through a unique vehicle number, and a head unit of the vehicle 10 may store the vehicle number and provide the vehicle number according to an external request.

The telematics center 20 may be a server for providing a telematics service, may manage service enrollment of a terminal installed in the vehicle 10, may collect information required by a user, and may transmit the information to the terminal installed in the vehicle 10 or transmit information received from the terminal installed in the vehicle 10 to a communication network provider or a corresponding institution (e.g., an insurance company and an emergency medical station).

The telematics center 20 may manage a database inside or outside the center 20 in order to store and manage vehicle information of the vehicle 10 and terminal information of the terminals 50 and 100.

The first terminal 50 and the second terminal 100 may each be embodied as a telematics terminal. The first terminal and the second terminal 100 may each provide a telematics service, and in particular, may each include a mobile communication module installed therein to provide a mobile communication service through a mobile communication network. For example, the mobile communication network may refer to a communication network supporting a mobile communication standard such as $3^{rd}$ generation (3G), long term evolution (LTE), and $5^{th}$ Generation (5G).

The first terminal 50 and the second terminal 100 may each be a terminal that is previously subscribed to and registered with a specific mobile communication network service and may be allocated separate telephone numbers to provide a mobile communication service to a subscriber. The first terminal 50 and the second terminal 100 may each be installed in a vehicle, and may control hardware such as a display, a touchscreen, and a speaker and execute a music, video, or navigation program according to a user request. In addition, the first terminal 50 and the second terminal 100 may each control a vehicle controller (not shown) to perform a charging or conditioning operation according to an external remote control request.

In the specification, hereinafter, it is assumed that the first terminal 50 is replaced with the second terminal 100 as a normal terminal for reasons such as malfunction and age of the first terminal 50 during use of the first terminal 50 installed in the vehicle 10.

The second terminal 100 may be, but is not limited to, a new non-used terminal (new terminal) or a terminal (old terminal) that has been used in another vehicle.

Figure 2:
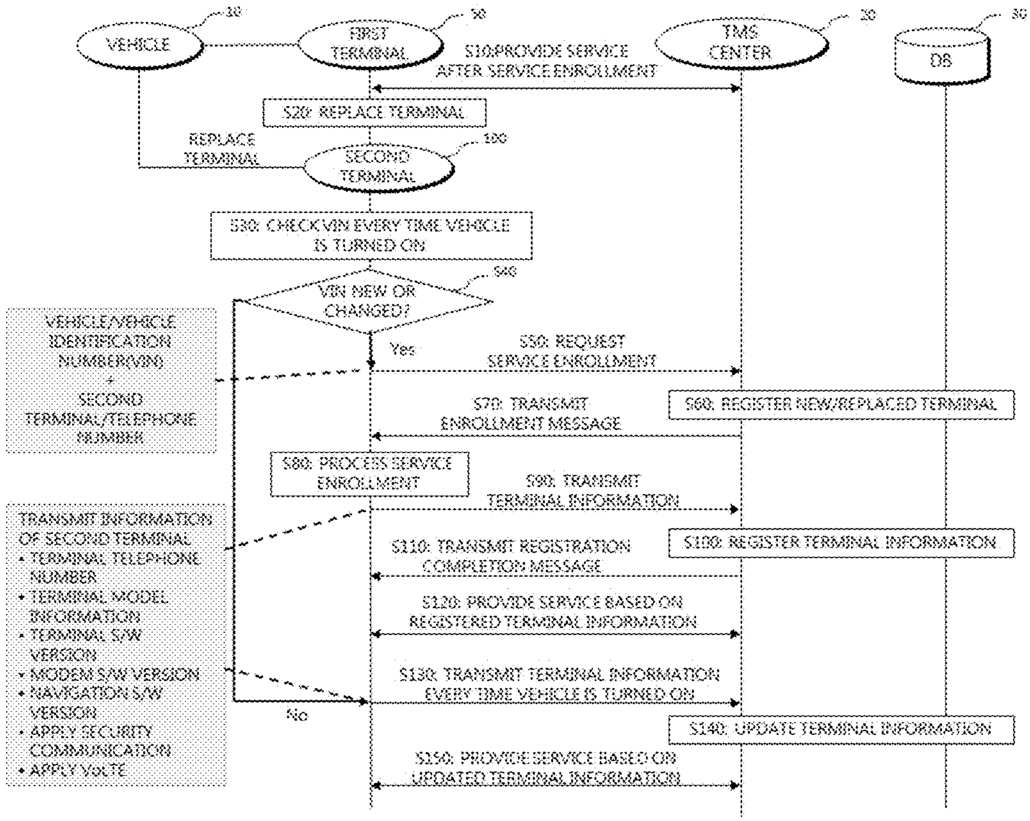
FIG. 2 is a flowchart for explanation of a method for providing a telematics service of the telematics service system illustrated in FIG. 1.
Figure 3:
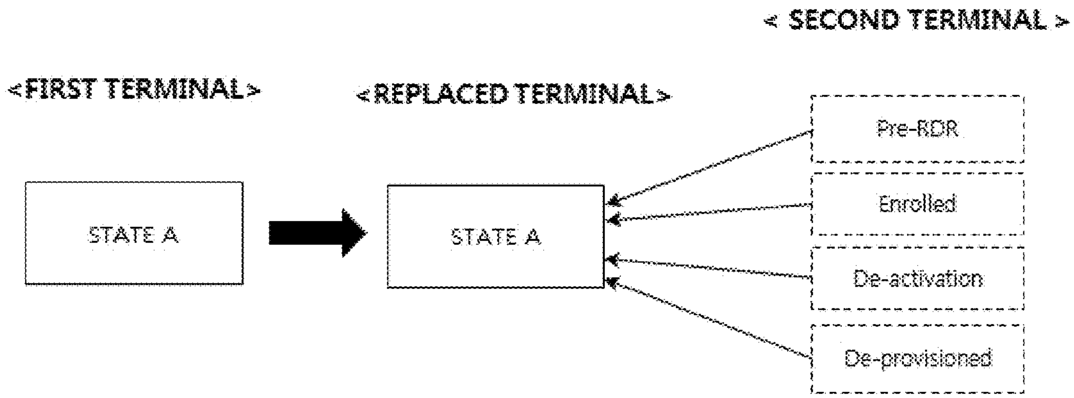
FIG. 3 is a diagram for explanation of an operation of processing service enrollment illustrated in FIG. 2.
Figure 4:
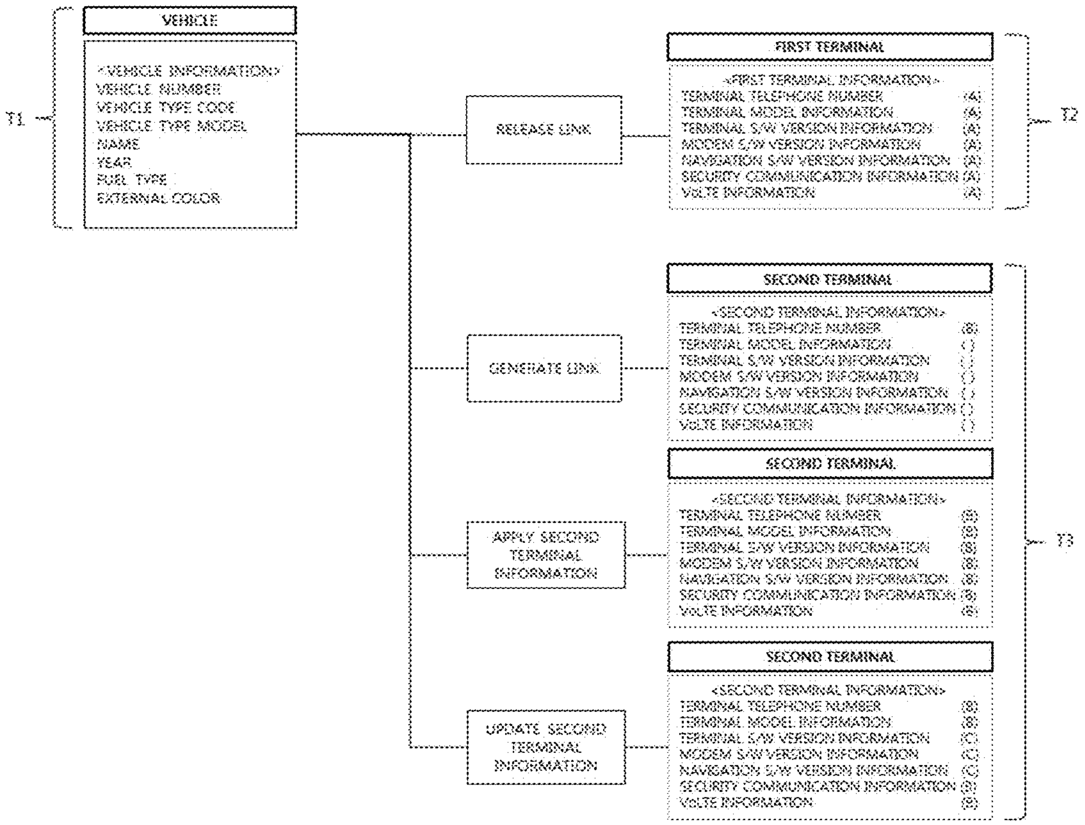
FIG. 4 is a diagram illustrating vehicle information and terminal information managed by a database illustrated in FIG. 2.

FIG. 2 is a flowchart for explanation of a method for providing a telematics service of the telematics service system illustrated in FIG. 1. FIG. 3 is a diagram for explanation of an operation of processing service enrollment illustrated in FIG. 2. FIG. 4 is a diagram illustrating vehicle information and terminal information managed by a database illustrated in FIG. 2.

Referring to FIGS. 1 to 4, the first terminal 50 may be installed in the vehicle 10 and may receive telematics service enrollment from the telematics center 20 to provide a telematics service (S10).

Then the first terminal 50 may be replaced with the second terminal 100 as a normal terminal for reasons such as malfunction and age of the first terminal 50 (S20).

The second terminal 100 replacing the first terminal 50 may receive a vehicle identification number (VIN) from a head unit of the vehicle 10 whenever the vehicle 10 of the replaced second terminal 100 is turned on (S30). For example, the VIN may be a vehicle number.

The second terminal 100 may determine whether the VIN is new or replaced based on the VIN transmitted after the vehicle 10 is turned on (S40), which corresponds to an operation for determining whether the second terminal 100 is replaced.

The second terminal 100 may be connected to an arbitrary vehicle to receive and store a VIN from the vehicle whenever being powered on, and in this regard, when the second terminal 100 does not store a VIN and receives the VIN of the vehicle 10, the received VIN may be determined to be new. In addition, when the second terminal 100 pre-stores a VIN and compares a newly received VIN with the pre-stored VIN, if the VINs are not the same, the VIN may be determined to be replaced.

When the newly received VIN and the pre-stored VIN are the same (No of S40), a subsequent operation S130 may be performed.

When the VIN is new or replaced (Yes of S40), the second terminal 100 may transmit an enrollment request signal for requesting service enrollment to the telematics center 20 (S50). The enrollment request signal may include a VIN (e.g., a vehicle number) of the vehicle 10 and a terminal identification number (e.g., a telephone number) of the second terminal 100.

The telematics center 20 may be operatively associated with a database 30 that stores and manages vehicle information of the vehicle 10 and terminal information of the terminals 50 and 100. The database 30 may establish the vehicle information and the terminal information as a table and manage the information. The database 30 may be positioned inside or outside the telematics center 20 but the scope of the present disclosure is not limited thereto.

FIG. 4 illustrates information items stored and managed by the database 30 and, in detail, illustrates a vehicle information table T1 for identifying a vehicle number of the vehicle 10 as a key value and a terminal information table T2 or T3 for identifying a telephone number of the telematics terminal 50 or 100 as a key value.

The vehicle information table T1 may include at least one of a vehicle number, a vehicle type code, a vehicle type model name, year, a fuel type, and external color, which correspond to information of a corresponding vehicle.

The terminal information table T2 or T3 may include at least one of a terminal telephone number, terminal model information, terminal software version information, modem software version information, navigation software version information, security communication information, and voice/multimedia over LTE (VoLTE) information, which is information of the corresponding terminal. Information stored in the terminal information table T2 or T3 may be required to normally provide a telematics service.

The telematics center 20 may release a link between the vehicle information table T1 corresponding to a vehicle number of the vehicle 10 and the terminal information table T2 of the first terminal 50 as an existing terminal. In addition, the telematics center 20 may generate a link between the vehicle information table T1 and the terminal information table T3 of the second terminal 100 as the replaced terminal (S60).

That is, in order to provide a normal telematics service to the first terminal 50 installed in the vehicle 10, the terminal information table T2 for storing information A corresponding to the first terminal 50 for each information item may be linked with the vehicle information table T1. However, as a vehicle number of the vehicle 10 and terminal information of the second terminal 100 as the replaced terminal are transmitted, the link between the vehicle information table T1 and the terminal information table T2 may be released and the vehicle information table T1 may be linked with the terminal information table T3 corresponding to the second terminal 100 in order to provide a telematics service to the replaced second terminal 100. The terminal information table T3 may preferentially store a received telephone number B of the second terminal 100 among the information items.

The telematics center 20 may store a current enrollment state for each vehicle. The enrollment state may be any one of a Pre-RDR state, an enrolled state, a de-activation state, and a de-provisioned state. The telematics center 20 may generate an enrollment message according to a previous enrollment state of the vehicle 10 containing the second terminal 100 that transmits the enrollment request signal.

For example, when the previous enrollment state of the vehicle 10 is a Pre-RDR state (i.e., the first terminal 50 is a Pre-RDR state), the telematics center 20 may generate an enrollment message including information of the Pre-RDR state.

The generated enrollment message may be transmitted to the second terminal 100 (S70).

The second terminal 100 that receives the enrollment message may process enrollment of a telematics service (S80). In this case, as shown in FIG. 3, when an enrollment state of the first terminal 50 is a state A (e.g., Pre-RDR state), the telematics center 20 may generate and transmit an enrollment message including information about the state A, and accordingly the second terminal 100 may be enrolled in the state A that is the same as the state A as a previous enrollment state.

Accordingly, even if the enrollment of the second terminal 100 is any one of a Pre-RDR state, an enrolled state, a de-activation state, and a de-provisioned state, the second terminal 100 may be enrolled in an enrollment state determined according to an enrollment message irrespective of a current state.

When service enrollment is completed, the second terminal 100 may transmit terminal information about the second terminal 100 to the telematics center 20 (S90). The terminal information may include at least one of a telephone number, model information, terminal software version information, model software version information, navigation software version information, security communication information, and VoLTE information. The telephone number may be used to identify the terminal information.

The telematics center 20 may receive the terminal information and store (or reflect) information B corresponding to the second terminal 100 in the database 30 for each information item except for a telephone number of the terminal information table T3 corresponding to telephone numbers, as shown in FIG. 4 (S100).

When the terminal information of the second terminal 100 is completely registered in the terminal information table T3, the telematics center 20 may transmit a registration completion message to the second terminal 100 (S110).

The second terminal 100 may request a telematics service after receiving the registration completion message, and the telematics center 20 may provide the telematics service based on the registered terminal information of the second terminal 100 (S120).

Even if a normal telematics service is possible when the first terminal 50 is installed in the vehicle 10, when only a telephone number of the second terminal 100 is transmitted to the telematics center 20 after the first terminal 50 is replaced with the second terminal 100, the telematics center 20 may not be capable of ensuring additional terminal information for a normal telematics service. Accordingly, the second terminal 100 may transmit additional terminal information items other than a telephone number to the telematics center 20 so as to enable a normal telematics service.

For example, it is assumed that the first terminal 50 is a terminal that needs to transmit and receive a message encrypted by applying encryption logic due to application of communication security and that the second terminal 100 is a terminal that needs to transmit and receive a non-encrypted message to which encryption logic is not applied due to non-application of communication security. In this case, since security communication about whether encryption logic is applied among terminal information items of the second terminal 100 is not transmitted to the telematics center 20, when the encrypted message is transmitted to the second terminal 100 without change, the second terminal 100 to which encrypted logic is not applied may not receive a normal telematics service.

Likewise, when the first terminal 50 and the second terminal 100 are different in terms of any one of terminal model information, terminal software version information, modem software version information, navigation software version information, security communication information, and VoLTE information, if corresponding information is not registered in the terminal information table T3 of the second terminal 100, a normal telematics service may be disabled.

Accordingly, the telematics center 20 may register terminal information that is automatically transmitted by the second terminal 100 and provide the telematics service based on the registered terminal information, and thus even if an existing terminal is replaced with another terminal with different characteristics, a normal service may be provided.

In addition, even if a terminal is replaced, the replaced terminal information may be managed so as to provide a telematics service according to the terminal characteristics.

Even if a terminal is replaced and the replaced terminal information is not directly checked by a user, the replaced terminal information may be automatically managed, thereby reducing labor cost and preventing human error due to incorrect input of a user to enhance service quality.

The second terminal 100 may receive a VIN from a head unit of the vehicle 10 whenever the vehicle 10 is turned on and determine whether the corresponding terminal is not replaced as the determination result (No of S40), the second terminal 100 may transmit terminal information of the second terminal 100 to the telematics center 20 (S130).

Assuming that a software version of each of a terminal, a modem, and a navigation device of the second terminal 100 is changed, information about the changed software version may be included in the terminal information.

The telematics center 20 may update new terminal information transmitted from the second terminal 100 to the terminal information table T3 (S140). As illustrated in FIG. 4, information C about the changed software version may be updated to the terminal information table T3.

The telematics center 20 may provide a telematics service based on the updated terminal information of the second terminal 100 (S150).

Some (e.g., software version information changed due to software upgrade) of terminal information of the second terminal 100 may be replaced whenever the vehicle 10 is turned on, and thus terminal information may be transmitted to the telematics center 20 in real time every time the vehicle is turned on so as to enable a normal telematics service without separate user manipulation.

According to forms of the methods for providing a telematics service, a telematics center may provide a telematics service based on terminal information that is automatically transmitted by a replaced terminal so as to provide a normal service even if the terminal is replaced with another terminal with different characteristics.

The aforementioned method for providing a telematics service can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), magnetic tapes, floppy discs, optical data storage devices, etc. The computer readable recording medium can also be distributed over network coupled computer systems so that the computer readable code is stored and executed in a distributed fashion.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for operating a telematics terminal installed in a vehicle, the method comprising:

determining whether the telematics terminal is a replaced terminal when the vehicle is turned on;

transmitting an enrollment request signal to a telematics center when the telematics terminal is the replaced terminal;

processing service enrollment based on an enrollment message transmitted in response to the enrollment request signal;

transmitting terminal information of the telematics terminal to the telematics center upon completing the service enrollment; and receiving a telematics service determined based on the terminal information.

2. The method according to claim 1, wherein the enrollment request signal comprises a vehicle number of the vehicle and a telephone number of the telematics terminal.

3. The method according to claim 1, wherein determining whether the telematics terminal is a replaced terminal comprises comparing a vehicle number stored by the telematics terminal with a vehicle number of the vehicle.

4. The method according to claim 1, wherein the service is enrolled in the same enrollment state as a previous enrollment state of the vehicle.

5. The method according to claim 1, wherein the terminal information comprises at least one of model information, terminal software version information, modem software version information, navigation software version information, security communication information, and voice/multimedia over long term evolution (VoLTE) information.

6. The method according to claim 1, further comprising:

transmitting new terminal information of the telematics terminal to the telematics center when the vehicle is turned on; and receiving a telematics service determined based on the new terminal information.

7. A method for operating a telematics center for providing a telematics service to a telematics terminal installed in a vehicle, the method comprising:

receiving an enrollment request signal from the telematics terminal when the telematics terminal is a replaced terminal;

transmitting an enrollment message based on a previous enrollment state of the vehicle containing the telematics terminal;

receiving terminal information of the telematics terminal that is transmitted after service enrollment is completed based on the enrollment message; and providing a telematics service determined based on the terminal information.

8. The method according to claim 7, wherein the enrollment request signal comprises a vehicle number of the vehicle and a telephone number of the telematics terminal.

9. The method according to claim 8, further comprising:

releasing a link between a vehicle information table corresponding to the vehicle number and a terminal information table of an existing terminal; and generating a link between the vehicle information table and a terminal information table of the telematics terminal corresponding to the telephone number.

10. The method according to claim 9, further comprising:

applying the received terminal information of the telematics terminal to the terminal information table.

11. The method according to claim 7, wherein the service is enrolled in the same enrollment state as a previous enrollment state of the vehicle.

12. The method according to claim 7, wherein the terminal information comprises at least one of model information, terminal software version information, modem software version information, navigation software version information, security communication information, and voice/multimedia over long term evolution (VoLTE) information.

13. The method according to claim 7, further comprising:

receiving new terminal information of the telematics terminal;

updating the received new terminal information to a terminal information table; and providing a telematics service based on the updated terminal information table.

14. A method for providing a telematics service to a telematics terminal replaced in a vehicle, the method comprising:

determining a pre-installed first terminal is replaced with a second terminal;

requesting service enrollment of the second terminal;

releasing a link between a vehicle information table of the vehicle and a terminal information table of the first terminal and generating a link between the vehicle information table and a terminal information table of the second terminal;

transmitting terminal information of the second terminal after service enrollment of the second terminal is completed;

applying terminal information of the second terminal to the terminal information table of the second terminal; and providing a telematics service determined based on the terminal information of the second terminal.

15. The method according to claim 14, wherein requesting service enrollment of the second terminal comprises transmitting a vehicle number of the vehicle and a telephone number of the second terminal.

16. The method according to claim 14, wherein the pre-installed first terminal is determined to be replaced with the second terminal based on a result obtained by comparing a vehicle number stored by the second terminal with a vehicle number of the vehicle.

17. The method according to claim 14, wherein the service is enrolled in the same enrollment state as a previous enrollment state of the vehicle.

18. The method according to claim 14, wherein the terminal information comprises at least one of model information, terminal software version information, modem software version information, navigation software version information, security communication information, or voice/multimedia over LTE (VoLTE) information.

19. The method according to claim 14, further comprising:

transmitting new terminal information of the telematics terminal to a telematics center when the vehicle is turned on; and providing a telematics service determined based on the new terminal information.

* * * * *